Feb. 16, 1932. J. VAN DER MARK 1,845,368
SYNCHRONIZING SYSTEM
Filed Dec. 19, 1929

INVENTOR
JAN VAN DER MARK
BY
ATTORNEY

Patented Feb. 16, 1932

1,845,368

UNITED STATES PATENT OFFICE

JAN VAN DER MARK, OF EINDHOVEN, NETHERLANDS, ASSIGNOR TO RADIO CORPORATION OF AMERICA, A CORPORATION OF DELAWARE

SYNCHRONIZING SYSTEM

Application filed December 19, 1929, Serial No. 415,234, and in the Netherlands February 13, 1929.

This invention relates to an improvement in or modification of the invention described and claimed in my application filed jointly with Belthasar Van Der Pol as United States application Serial No. 414,848, filed on December 18, 1929 (docket No. 4,079) and having for its object to provide means for synchronizing devices which are spaced apart. The present invention is especially suitable for carrying out a process in which an electric oscillation is set up in the rhythm of one device and transferred to the point at which the other device is arranged, where it is caused to act synchronizingly on a locally generated relaxation oscillation which, if required, after amplification, is caused to control the rhythm of the other device.

A suitable reciving arrangement for carrying out the said process comprises preferably a device for receiving the synchronization oscillations, a generator for relaxation oscillations, a device for putting the frequency of the relaxation oscillations under the control of the synchronizing oscillations received, a device the movement of which has to be controlled and connected to this device an apparatus the movement of which is controlled by the relaxation oscillations.

According to the invention a receiving arrangement is used in which both by the synchronizing oscillation and by that brought about under the influence of the movement of the device to be synchronized a system is influenced in which relaxation oscillations are generated, said systems, if required with the interposition of one or more stages of amplification, controlling the operating speed of the said device.

The invention will be more clearly understood by reference to the accompanying drawings in which an embodiment thereof is illustrated.

Figure 1:
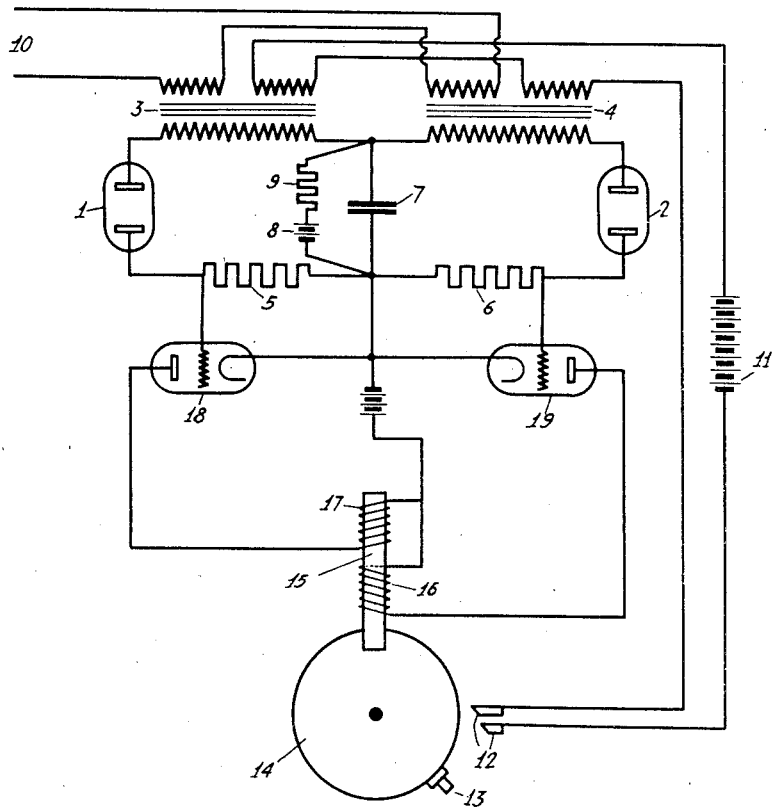
Figure 2:
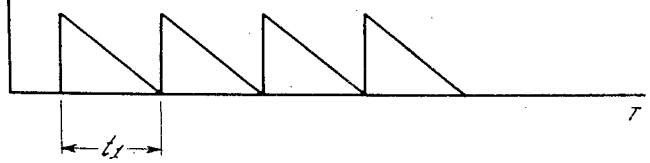

Figure 1 shows the diagram of connections of an arrangement according to the invention, and Figure 2 illustrates the action more clearly.

The arrangement comprises discharge tubes 1 and 2 which may preferably consist of glow discharge lamps and which are connected in series with the secondary windings of transformers 3 and 4 and with resistances 5 and 6. The common point of said windings is connected to that of the resistances through a condenser 7 which has connected in parallel to it a battery 8 and a resistance 9 connected in series therewith. The synchronizing signals electrically transferred to the arrangement are fed through leads 10 to one of the two primary windings of either of the transformers 3 and 4, the said windings being connected in series. The remaining primary windings which are also connected in series receive current from a battery 11 and the circuit constituted can be closed across a contact device 12 which co-operates with a contact 13 arranged on a braking pulley 14. This pulley is coupled to the moving parts of the apparatus to be synchronized. The speed of rotation of the pulley which can be driven in any known manner is influenced by a braking magnet 15 provided with two windings 16 and 17. These windings are so connected that during a given direction of the current the permanent magnetism is strengthened by one winding and weakened by the other winding.

The primary windings of the transformers 3 and 4 that are connected in series with the leads 10 are connected relatively to the polarity of the battery 8 and to the source of the synchronizing signals such that in the secondary of the first-mentioned transformer a voltage is induced which supports the battery voltage, whereas the latter generates a counteracting voltage in the secondary of the last-mentioned transformer. As regards the primary windings that are connected in series with the contact device 12 the very voltage secondarily induced in the transformer 4 supports the battery voltage, which is counteracted by the voltage secondarily induced in the transformer 3. Now, the device is driven at such a speed that the contact device 12 is closed approximately in the rhythm of the synchronizing signals.

If the elements of the arrangement described are dimensioned in a correct manner, relaxation oscillations will occur on receipt of synchronizing signals through the line 10, in the system constituted by the condenser 7 and by the resistance 9 and battery 8 which are connected in parallel thereto, and the tube 1 consequently breaks down. Thus a potential drop will occur in the resistance 5 which can be amplified by a tube 18 so that the winding 17 of the braking magnet will be energized for a short length of time.

If on the other hand the contact device 12 is closed by the contact-finger 13 arranged at the circumference of the pulley, the same phenomenon will arise with respect to the glow discharge tube 2, the resistance 6 and the amplifying valve 19, so that in this case the winding 16 will be energized which exercises an opposite action on the magnet 15 from the winding 17.

When the pulley 14 runs, for example, too fast, the contact 12 will be closed prior to the reception of the synchronizing signal. By reason of the break-down of the tube 2 and the resulting energization of the winding 16 the braking force of the magnet 15 is strengthened. If a synchronizing signal is received earlier, the winding 17 will bring about a momentary weakening of the permanent braking force.

If the synchronizing signal is received at the moment when the contact device 12 is closed no voltage at all will be induced in the secondary windings of the two transformers by reason of the primary windings of either of the said transformers counter-acting one another and in neither of the tubes 1 and 2 a break-down can occur.

The action of the system above described is based on the characteristic well-known in systems having relaxation oscillations that the value of the voltage $V_s$ necessary to control such a system varies according to time, as indicated in Figure 2.

With the arrangement above described this means that as soon as one of the tubes 1 or 2 has broken down, the voltage of the synchronizing signal is not capable, until after some length of time, of again bringing about a break-down.

If in the interval $t_1$ a synchronizing signal and a signal due to the contact device 12 arrive in succession, the signal that arrives first will influence the synchronizing device and the second one will remain inactive.

It is, of course, obvious that it is possible without departing from the scope of the invention to use instead of one amplifying stage constituted by two discharge tubes two or more stages of the said kind.

What I claim is:

1. In a system for synchronizing a local body with a remotely spaced body, a pair of glow discharge devices, a source of synchronizing signals coupled to each of said glow discharge devices, a local source of impulses indicating by the variance in time period from the synchronizing signals the deviation of the controlled body from synchronous speed, means for rendering the first of said glow discharge devices operative and the second of said glow discharge devices inoperative to pass current in accordance with the receipt of synchronizing signal impulses, means for rendering the second of said glow discharge devices operative and the first of said glow discharge devices inoperative by the said local signals, an amplifying system operatively connected with each of said glow discharge devices, and a speed accelerating and retarding device operatively connected with the controlled body and arranged to accelerate or retard the speed thereof in accordance with the operation of said first and second glow discharge devices.

2. In a system for synchronizing a local rotary body with a similar remotely spaced body, a pair of glow discharge devices, a source of signals for indicating the rate of rotation of the remote body, a local source of impulses indicating the rate of rotation of the local body, means for rendering the first of said glow discharge devices operative and the second of said glow discharge devices inoperative to pass current at time periods when the remote signals arrive prior to the local signal impulses, means for rendering the second of said glow discharge devices operative and the first of said glow discharge devices inoperative at time periods when the said local signals arrive prior to the remote signals, and means for rendering both of said discharge devices inoperative upon simultaneous receipt of both of said signals, an amplifying system operatively connected with each of said glow discharge devices, and a speed device for accelerating or retarding the local body at time periods of variance in the receipt of said signals.

3. In a system for synchronizing a local body with a remotely spaced body, a pair of glow discharge devices, a source of synchronizing signals indicating the movement of the remote body coupled to each of said glow discharge devices, a local source of impulses indicating by the variance in time period the deviation of the local body from synchronous speed also coupled to said discharge devices, means for rendering the first of said glow discharge devices operative and the second of said glow discharge devices inoperative to pass current in accordance with the receipt of synchronizing signal impulses, means for rendering the second of said glow discharge devices operative and the first of said glow discharge devices inoperative by the said local signals, and means for limiting the control at any instant to only one of said signals, an amplifying system operatively connected with each of said glow discharge devices, and a device for accelerating or retarding the local body in accordance with the time variance in the said local impulse from the synchronizing impulse as causing operation of said first and second glow discharge devices.

4. In a system for coordinating the speed of a local body with the speed of a remotely spaced body, a source of signals indicating the period of movement of a remotely spaced body, a source of signals indicating the time period required for a predetermined movement of the locally controlled body, a plurality of glow discharge devices having connected in series therewith a source of current of a value slightly below that required to produce a flow of current therethrough, means for impressing the received synchronizing impulses upon each of said glow lamps and rendering the first of said glow lamps operative and the second of said glow-lamps inoperative thereby, means for impressing the locally produced indications of movement upon said glow discharge devices and rendering the second thereof operative and the first thereof inoperative by said signals, a potential controlled device connected with each of said glow discharge devices, means for utilizing the potential drop produced in said potential controlled device in accordance with the glow discharge device rendered operative, and means for accelerating or retarding the locally controlled body in accordance with the glow discharge device rendered operative by either of said signals.

5. In a system for coordinating the speed of a local body with the speed of a remotely spaced body, a source of signals indicating the period of movement of a remotely spaced body, a source of signals to indicate the time required for a predetermined movement of the locally controlled body, a plurality of glow discharge devices having connected in series therewith a source of current of a value slightly below that required to produce a flow of current therethrough, means for impressing the received synchronizing impulses upon each of said glow lamps and rendering the first of said glow lamps operative and the second of said glow lamps inoperative thereby at periods when the synchronizing signal arrives prior to the local signal, means for impressing the locally produced indications of movement upon said glow discharge devices and rendering the second thereof operative and the first thereof inoperative by said signals at periods when the local signal arrives prior to said synchronizing signal, and means for rendering both of said discharge devices inoperative upon simultaneous receipt of both of said signals, a resistor connected with each of said glow discharge devices, means for utilizing the potential drop produced in said resistor by the current flow through the glow discharge device rendered operative for producing an accelerating or retarding force upon the said local body for altering the speed thereof in a manner to correspond to the speed of the remote body.

JAN van der MARK.